(12) United States Patent
Meldahl et al.

(10) Patent No.: US 7,583,387 B2
(45) Date of Patent: Sep. 1, 2009

(54) SEISMIC EXPLORATION

(75) Inventors: Paul Meldahl, Forus (NO); Eiolf Vikhagen, Trondheim (NO); Johan Ole Lokberg, Trondheim (NO)

(73) Assignee: Statoil ASA, Stavanger (NO)

( * ) Notice: Subject to any disclaimer, the term of this patent is extended or adjusted under 35 U.S.C. 154(b) by 231 days.

(21) Appl. No.: 10/588,926

(22) PCT Filed: Feb. 10, 2005

(86) PCT No.: PCT/GB2005/000452

§ 371 (c)(1),
(2), (4) Date: Dec. 28, 2006

(87) PCT Pub. No.: WO2005/078479

PCT Pub. Date: Aug. 25, 2005

(65) Prior Publication Data

US 2008/0007715 A1 Jan. 10, 2008

(30) Foreign Application Priority Data

Feb. 10, 2004 (GB) ................................ 0402914.6

(51) Int. Cl.
*G01B 11/02* (2006.01)
(52) U.S. Cl. ..................................... 356/498
(58) Field of Classification Search .................. 356/498
See application file for complete search history.

(56) References Cited

U.S. PATENT DOCUMENTS 4,576,479 A 3/1986 Downs
5,070,483 A 12/1991 Berni et al.
5,155,363 A 10/1992 Steinbichler et al.
5,426,498 A 6/1995 Brueck et al.
5,493,398 A * 2/1996 Pfister ........................ 356/512

(Continued)

FOREIGN PATENT DOCUMENTS

DE 197 36 169 A1 4/1999

(Continued)

OTHER PUBLICATIONS

Berni A.J., "Remote Sensing of Seismic Vibrations by Laser Doppler Interferometry," Geophysics, Society of Exploration Geophysicists, Tulsa, US 59(12):1856-1867 (1994).

*Primary Examiner*—Tarifur Chowdhury
*Assistant Examiner*—Jonathon D Cook
(74) *Attorney, Agent, or Firm*—Patterson, Thuente, Skaar & Christensen, P.A.

(57) ABSTRACT

An instrument for studying an object (12) comprising a movable interferometer having a laser source and a plurality of detectors (24) arranged in an array. The laser source is expanded and arranged to direct a converging object beam (21) towards a point (22) or line beyond the object (12) whereby a speckle pattern of light reflected from the object (12) is detected by the detector or detector array (24). The point (12) or line at which the laser source is arranged to converge the object beam (21) is approximately the same distance beyond the object (12) as the object is spaced from the source. The speed of movement of the instrument, the sampling rate of the detectors (24) and size of the area (23) of the object illuminated by the converging laser object beam (21) are arranged so that sequential areas (23) of the object (12) studied overlap.

22 Claims, 6 Drawing Sheets

U.S. PATENT DOCUMENTS

| | | | |
|---|---|---|---|
| 5,623,307 A | * | 4/1997 | Kotidis et al. ............... 356/493 |
| 5,650,610 A | | 7/1997 | Gagnon et al. |
| 5,793,357 A | * | 8/1998 | Ivey et al. ................... 345/166 |
| 6,008,887 A | * | 12/1999 | Klein et al. ................. 356/28.5 |
| 6,081,481 A | | 6/2000 | Sabatier et al. |
| 6,188,483 B1 | * | 2/2001 | Ettemeyer ................... 356/496 |

FOREIGN PATENT DOCUMENTS

| EP | 1 400 779 A1 | 3/2004 |
|---|---|---|
| WO | WO 2004/003589 | 1/2004 |

* cited by examiner

Basic signals S(i,t) from detector element i=1,2..4

Signal R(i,t) after subtraction of reference values
and rectification 1=1,2..4

Averaged signal (raw signal) R(t) from the detector array

Calculated phase values α(t) after use of phase algorithm

Unwrapped phase values, or displacement U(t) of OUI

SEISMIC EXPLORATION

RELATED APPLICATIONS

This application claims priority to PCT Application No. PCT/GB2005/000452 filed Feb. 10, 2005, and Great Britain Application No. 0402914.6 filed Feb. 10, 2004 the disclosures of which are hereby incorporated by reference in their entirety.

FIELD OF THE INVENTION

The present invention relates to seismic exploration techniques and the seismic imaging of subsurface layers. It is particularly but not exclusively concerned with submarine seismic exploration and with producing seismic interpretation reports of subsea geological structures.

BACKGROUND OF THE INVENTION

Conventional seismic methods for exploring subterranean strata beneath the seabed involve generating a seismic wave and measuring the response from the subsurface. The seismic wave may be simple or complex and may be generated at sea level, beneath the surface of the water or at the seabed. The response is detected by a series of spaced receivers which are commonly positioned on cables towed behind an exploration vessel or within nodes positioned on the sea floor. Generally, the receivers are held stationary for the detection step and are then moved to a different location and the process is repeated.

The response to a seismic event in the solid rock at the sea floor includes a compression wave (P-wave) and a shear wave (S-wave). P-waves are considered well suited to imaging structures while the combination of S-waves is well suited to determining rock and fluid characteristics. P-waves travel through rock and sea water while S-waves travel through rock only. Thus, if the receivers are hydrophones floating at or beneath the surface, they will detect only the P-waves. In order to detect the S-waves, it is necessary to use geophones located at the seabed.

It has also been recognised that better seismic imaging can be achieved by making use of both P- and S-waves. However, the costs involved in positioning and re-positioning geophones on the sea bed has been found to be prohibitively costly. This is particularly so since in order to detect S-waves effectively, three independent orthogonal and stationary geophones are required at each recording location.

4C seismic imaging of the subsurface may add more and better information to exploration due to high quality recording of shear waves (S-waves) at the water bottom. Unfortunately, 4C-imaging has suffered from a combination of extreme high acquisition cost, variable payback and uncertainties in the prediction of payback.

It has been recognised that the cost effectiveness of carrying out such seismic imaging, and in particular S-wave measurements, could be greatly reduced by avoiding the need to locate detection apparatus at the seabed. Thus, it would be desirable to measure an S-wave from a position spaced from the seabed and so allow effective re-positioning of the detection apparatus with respect to the seabed. However, as mentioned, S-waves do not travel through sea water, making direct sensing remote from the seabed impossible using traditional techniques. Remote sensing has further inherent problems in that the detection apparatus is subjected to ocean currents which can inhibit effective positioning of the detection apparatus, and introduce noise into measurements, making correlation of the results very difficult.

It is therefore an object of the invention to allow seismic exploration in which both P-waves and S-waves are detected but without the disadvantages of known techniques.

A large range of interferometric techniques and instruments exist for measuring parameters such as distance, topography, dimensions, displacements and vibrations. Many of these interferometers are based on the use of a laser, where a detector or a detector array is illuminated with laser light reflected from the object under investigation and also illuminated by a so called reference beam. As the two beams interfere, different factors such as object displacements can be detected and quantified, as the nature of the interference gives information relating to such parameters.

A commonly used technique is the so called "laser doppler velocimetry" (LDV). With this technique, the displacements or vibrations of a single point on the object under investigation (OUI) are measured, as the laser light reflected from this point undergoes a quantified shift in wavelength as the object is moved with a given velocity. Some LDV systems can also be used in a scanning mode, where displacements or vibrations can be mapped over a full field.

Some other types of interferometers are being used for the testing of optical components and other smooth surfaces. In such cases, the light reflected from (or transmitted through) the object under investigation (object light) has a more or less flat or spherical phase front, and when this wave is combined with an expanded reference beam, interference fringes appear and these can be used to analyse surface properties of the object under investigation.

When interferometers such as LDV's or other interferometers are used to measure displacements of rough surfaces, the light reflected from the object surface will have a speckle nature, where the regular flat or spherical wave front is degenerated to a chaotic spatial pattern with varying intensity and phase. This speckle pattern is the result of interference between many waves (wavelets) reflected from different microscopic points on the rough object surface.

When interferometric measurements are carried out on different types of mechanical components, buildings, or even on the ground (seismic waves and earthquakes), speckle light from the object must be used for the measurement instead of a smooth wave as with testing of optical surfaces. This normally requires that the speckle pattern must not move or change in space or on the detector surface, which means that a good stability is normally required between the illumination/detector system (interferometer) and the object under investigation. Transverse movements and object tilt in particular will make the speckle pattern move and change on the surface of the detector or the detector array. Some stability problems may be overcome by using very fast detector systems, but generally, lack of stability represents a major problem to interferometric measurements.

SUMMARY OF THE INVENTION

It is an object of the present invention to provide an interferometer suitable for seismic exploration. It is a further object of the invention to provide an interferometer capable of taking measurements while in motion.

Thus, according to the new invention, it is possible to measure small movements and seismic waves in the sea floor while the instrument is moving through the water above the sea floor. This means that relatively large sea floor areas can be measured and investigated in a relatively short time. The interferometer can also be used in a large range of other applications where a moving interferometer is required.

According to one aspect of the invention, there is provided an instrument for studying an object, comprising an interferometer having a source of coherent object light and a source producing a reference beam which is coherent with the object beam, and a detector or a plurality of detectors arranged in an array, in which: the coherent light source is expanded and arranged to direct a converging object beam towards a point beyond the object and to produce a reflected object beam reflected from the object; a speckle pattern of light representing the effects of the reflection from the object, which is detected by the detector or the detector array.

Preferably, the object beam and the reference beam are laser beams, and may be derived from a common laser source.

Preferably, the point at which the laser source is arranged to converge is approximately the same distance beyond the object as the object is spaced from the source. Preferably the instrument is movable, either under its own power or otherwise, for example by being towed. Preferably, the speed of movement of the instrument, the sampling rate of the detectors and size of the area of the object illuminated by the converging laser beam are arranged so that sequential areas of the object studied overlap. Preferably, the laser beam is capable of a variable focus distance adjustment.

Preferably, if an array of detectors are used instead of a single detector, the array of detectors is relatively narrow in the direction of movement and relatively long in the transverse direction. This is generally valid for laser beams with directions which are perpendicular to the directions of movement (z direction plus directions sideways in the yz-plane). Generally, the detector or the detector array will preferably be arranged such that i) the laser beam direction is normal to the plane of the detector or the detector array and ii) the long dimension of the array is directed at about 90° to the moving direction of the instrument (x-direction).

If the light is redirected to other positions via e.g. mirrors and/or imaging optics or other optical elements, then the detectors or the detector arrays may have other positions, structures, dimensions or spatial arrangements accordingly. However, the light should be "picked up" according to the preferred positions described above. The instrument may include one or more additional detectors or arrays of detectors and means for generating one or more additional converging laser beams. Preferably, there are three detectors or detector arrays which are arranged to have three different sensitivity directions. When combined, these can pick up displacements of the object in all directions (x,y,z).

The detector or the detector array detects a single speckle or a speckle pattern, and it is desirable for the speckle pattern to be changed as little as possible while the interferometer is moving in space. The converging illumination arrangement helps to minimise changes in the speckle pattern while the interferometer is being moved.

The interesting information on displacements of the object and/or the interferometer is given by the (modulation of the) interference term which is equal to the speckle pattern intensity combined with the reference wave. The intensity in this interference term varies due to object displacements only, only as long as the speckle pattern (object light) remains unchanged. Thus, there are three intensity terms which the arrays are preferably detecting: the object speckle wave intensity, the reference wave intensity and the interference term which is a result of the two first intensities and which will go from positive to negative to positive to negative and so on, as it is modulated by object movements. It is preferable to isolate intensity modulation of the interference term from intensity changes in the object speckle light. In practice, the reference intensity remains unchanged, and so represents no problem this way.

Preferably, the (or each) interferometer is a "line interferometer" in which there are a plurality of detectors or detector arrays. Preferably these are arranged in a line of arrays extending in the direction of motion of the instrument (x-direction).

The line interferometer can be used for determining the frequency difference between neighbouring detectors or detector arrays in the detector line and so to calculate the distance from the interferometer to the object under investigation.

The line interferometer can have different types of designs. The single detectors or detectors arrays can be physically located on the line as described above, or alternatively mirrors, prisms, lenses, optical fibers, integrated optical systems or other optical elements can be used to redirect the light from areas along the line and to other locations where the detectors or detector arrays are placed. The principle is that the light reflected from the surface is picked up along a line and directed to the corresponding detectors or detector arrays and combined with a reference light beam. The line does not need to be a geometrically perfect line, it can have different and irregular shapes as long as it has a main dimension which goes in the x-direction as described earlier.

Instead of using a single detector line or line of detector arrays, detector arrays spread over a full field with total dimensions in two directions can be used. Other alternatives can be crossed detector lines for sensitivity in two directions, circular detector lines and so on.

The invention therefore provides an alternative to existing stationary 3-component geophones. In addition, adding a hydrophone provides an alternative to standard 4-component seismic tools. The invention can also be used as an alternative land seismic 3-component geophone where it may increase the speed of acquisition, since the device can move while recording.

According to another aspect of the invention, there is provided a method of conducting an interferometric study of an object which comprises: deploying an instrument as claimed in any of Claims 1 to 12 in the vicinity of the object; directing a converging beam of coherent light from the expanded source on to the surface of the object; moving the instrument relative to the object while maintaining a substantially constant distance between them, whereby the beam tracks across the surface of the object; combining the reflected object beam with the reference beam thereby producing a speckle pattern; detecting at intervals the speckle or speckle pattern using the single detector or the detector array; comparing the intensity variation in speckle patterns in order to identify changes in the intensity of the speckle patterns; and creating a set of data representing the changes.

Any changes identified in the intensity of sequential speckle patterns may be associated with movements of the surface of the object, and/or vibrations of the instrument. Preferably, the distance between the instrument and the object is in the range 0.5 to 10 m, more preferably 3 to 5 m. Preferably, the area of the surface of the object illuminated by the laser beam has a diameter in the range 0.1 to 20 cm, more preferably 0.5 to 10 cm for example 5 to 9 cm. Preferably, the speed of the instrument when moving is in the range 0.1 to 5 m/s, more preferably 0.3 to 2 m/s.

Preferably the method comprises directing one or more additional converging laser beams on to the surface of the object and detecting the resulting speckle patterns using respective detectors or detector arrays. The laser beams can be directed to different areas on the surface of the object or to the same area.

Movement of the instrument and any incidental displacements of the instrument may be filtered out of the data. Also, changes in distance between the instrument and the object may be filtered out of the data. Preferably, however, unwanted movements are partly or totally eliminated by adopting a constant velocity.

In a preferred arrangement, all "dc" velocity components are eliminated, but all "ac" velocity components are detected. To distinguish between seismic movements of the sea floor and non-linear (ac) movements of the instrument, accelerometers mounted in the instrument can be used, or frequency analysis of the signal, or a method based on comparison of signals from neighbouring units, or it may also be possible to vibration isolate the interferometer (for instance with a spring arrangement) so that it moves linearly within the measurement period.

The method may also include the step of generating a seismic event, whereby movements in the surface of the object represent responses to the seismic event. The object may be the earth's surface, particularly, the sea bed which would include the bottom of any area of water.

According to another aspect of the invention, there is provided a method of conducting a seismic survey which comprises: generating a seismic event, applying the seismic event to the earth's surface; deploying in the vicinity of the earth's surface an instrument comprising means for generating a plurality of expanded and converging beams of coherent light from one or more sources, means for generating a plurality of reference beams which are spatially and temporally coherent with the respective source beams, and a plurality of corresponding detectors or detector arrays; directing the converging laser beams on to the surface of the earth to produce reflected beams; moving the instrument relative to the earth's surface at a relative constant distance above the earth's surface whereby the source beams track across the earth's surface; combining the reflected beams with the respective reference beams to produce a plurality of respective speckle patterns; detecting at intervals the speckle patterns using the detectors or detector arrays; comparing, for each source beam, sequential speckle patterns detected in order to identify changes in the intensity of the speckle patterns resulting from movements in the earth's surface in response to the seismic event; and creating a set of data representing the changes.

Preferably, the seismic event is applied to the sea bed and the instrument is deployed in the vicinity of the sea bed. Changes in the topography of the earth's surface may be filtered out of the data, though this should not be necessary since surface topography should not influence the measurements taken.

The invention also extends to a method of producing a seismic survey report which comprises carrying out such a method, analysing the set of data to derive representations of underlying strata, and assembling the representations as a depiction of the geological nature of the region.

Particles at the seabed will respond both to P-wave and S-wave stimulation and so their movements will be representative of the two waves. Since these movements are detected from a distance, the disadvantages of the prior art are avoided with there being no need to make contact with the surface and therefore no need to disengage before repositioning the detecting apparatus.

Preferably, the analysing step comprises analysing surface displacements and/or velocities and/or accelerations by measurements of changes in the distance (velocity) between a theoretical line along which the instrument travels and the object surface. The instrument velocity can be measured separately by three instrument-mounted accelerometers.

The invention contemplates using a calculation algorithm based on e.g. storing of reference data, sequential subtraction from reference data, rectification, averaging, using a phase calculation algorithm based on an arcsine function fast fourier transform or other functions and algorithms.

The z-component of the surface particle velocity is similar to the pressure component which could be measured with a mounted hydrophone on the instrument. This redundant measurement can be used to calibrate the system and make it more robust against ambient noise and system noise.

In a preferred embodiment, the monitoring apparatus comprises three sources of coherent mono frequency light directed at the surface area being monitored, and a receiver for each reflected coherent light beam. Preferably, the two coherent beams in each of the three units—the reflected object (speckle) beam and the uniform reference beam—interfere, and by monitoring the time variation in light intensity within a speckle or a subset of speckles, the 3D-particle velocity in the surface can be calculated using interferometry principles.

Preferably, the seismic event comprises a seismic wave having a wavelength in the range 5 to 100 m and a duration from 2 ms to 1000 ms. Depending upon the depth of the exploration target and the seismic P and S-velocities, preferably, the response period is from 5 to 20 seconds. The seismic event may be generated using apparatus on a surface vessel. It may be generated at the surface or below the surface of the ocean. The event may be generated at the sea bed by seismic sources using the land seismic source principles, in which case P and S-waves can be generated.

BRIEF DESCRIPTION OF THE DRAWINGS

The invention may be carried into practice in various ways and some embodiments will now be described by way of example with reference to the accompanying drawings, in which.

DETAILED DESCRIPTION OF THE DRAWINGS

Figure 1:
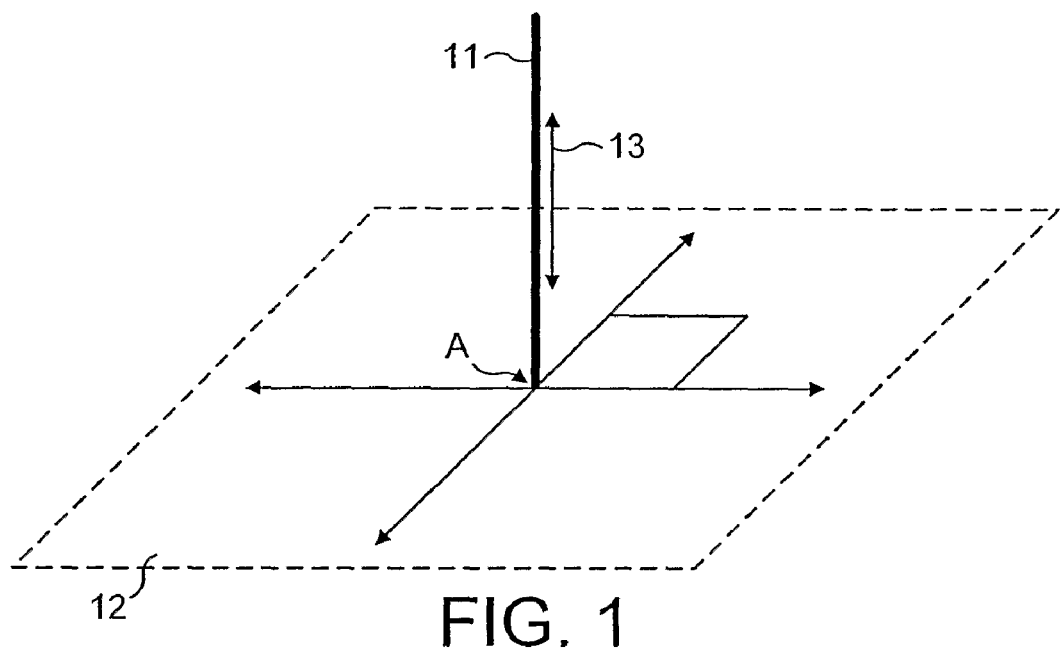
FIG. 1 is a schematic diagram illustrating the basic functionality of the an instrument in accordance with the invention.

The basic functionality and requirements of the instrument are illustrated in FIG. 1, which shows a laser beam 11 which illuminates and measures displacements at a point A on the sea floor 12 (or the object under investigation OUI). The sensitivity direction 13 for this measurement is along the laser beam direction (longitudinal direction for the laser beam). The interferometer (not shown) measures relatively small varying displacements in this direction, for example seismic signals, while large superimposed velocities relatively between the object under investigation and the interferometer are also present. These large superimposed velocities are both in the transverse directions for the laser beam and in the longitudinal direction. The interferometer according to the invention provides the following features:
  i) Large or small transverse movements do not influence the measurement of the signal along the sensitivity direction;
  ii) Large transverse movements are used to eliminate or reduce constant velocities in the longitudinal direction for the laser beam (same as the sensitivity direction for the measurement). Thus, the interferometer includes a high pass filter function, where constant velocity components (DC levels) are reduced or removed, while varying velocity components (AC levels) are detected and quantified;
  iii) Changes in the distance between the interferometer and the sea floor due to surface height variations (topography) do not influence the measurement of the signal. This means that the interferometer actually measures changes in distance between the sea floor and the straight line in space along which the interferometer is moving; and
  iv) 3-dimensional measurements can be performed, as 3 or more beams can be used at the same time.

Figure 2:
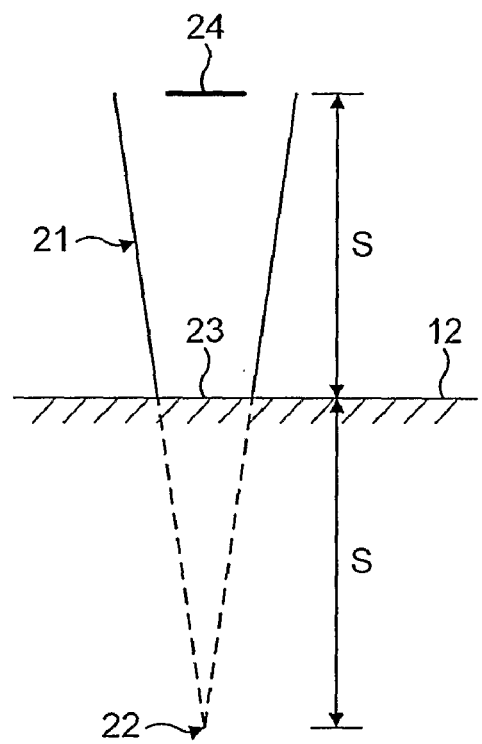
FIG. 2 shows the arrangement of a converging laser beam.
Figure 3A:
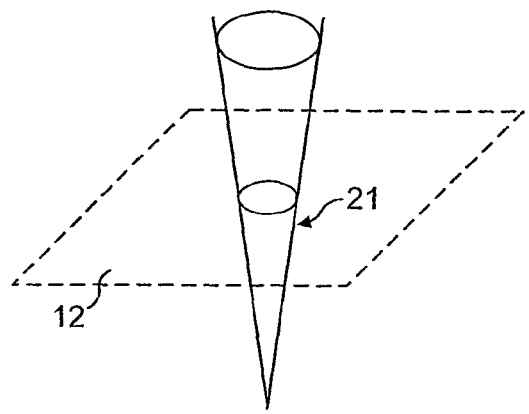
FIG. 3a and 3b show two alternative forms of convergence for the laser beams.
Figure 3B:
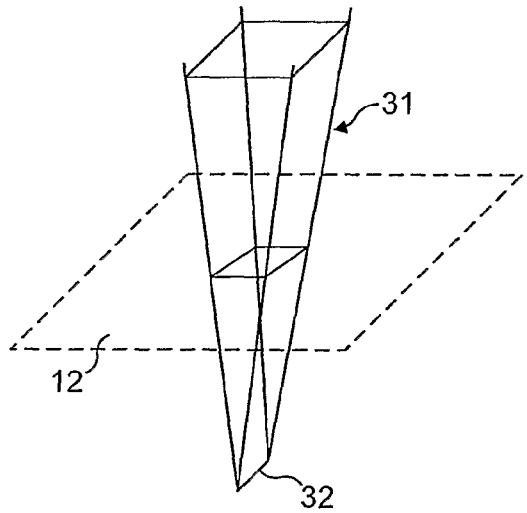

In the basic interferometer design, a single laser beam 21 is directed towards the sea floor surface 12. It is assumed that the surface 12 is moved homogeneously in the area covered by the laser beam 21. The laser beam 21 is first expanded and then focused so that the diameter of the illumination beam 21 is decreasing on the way towards the surface 12. The converging laser beam has a focus point 22 approximately as shown in FIG. 2. If the distance between the interferometer and the surface 12 is changed, the focus of the laser beam 21 can be adjusted accordingly. The beam diameter 23 at the surface 12 is typically from less than 1 centimeter up to several centimeters. The shape of the laser beam 21 can be circular (FIG. 3a) or rectangular or may have another shape. The beam can also be created, for instance by the use of cylindrical optical elements, so that the beam converges in one direction only, as shown in FIG. 3b. In this case, the beam 31 is focused to a line 32 instead of a point.

A detector 24 (FIG. 2) is located close to the laser beam line or at another position. If the laser beam is reflected via a partly transparent glass plate or another beam splitter, then the detector can be located virtually on the laser beam line. A reference beam which is coherent or partly coherent with the object light reflected from the surface 12 is combined with the object light to illuminate the detector 24. The two waves—the object wave and the reference wave—interfere to give an interference pattern which is detected by the detector 24. The reference wave can be combined with the object light different ways. It can for instance come from the end of an optical fibre placed in the aperture in front of the detector 24, or it can be reflected via a partly transparent glass plate or it can be combined other ways.

Figure 4:
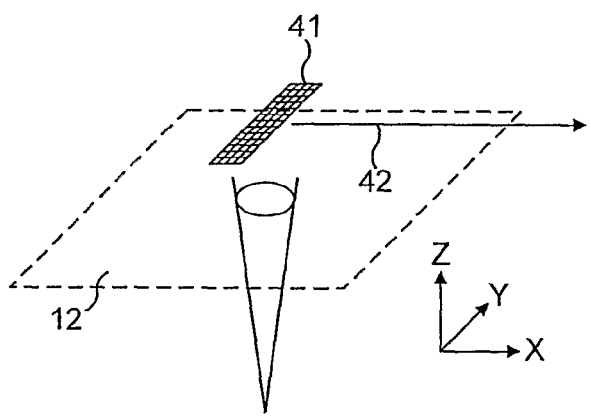
FIG. 4 shows an arrangement for rectangular array of detectors when detector arrays are being used instead of single detectors.

The laser light reflected from the surface will normally have a speckle nature. Instead of using a single detector 24, a detector array 41 or a line of detectors can be used, such that each detector element is covered by a speckle or a part of a speckle, or a limited number of speckles. Where a rectangular array 41 of detector elements is used it will preferably be designed as a long and narrow array (for example with 3×70 small detector elements, but other numbers of detector elements can also be used). The longest dimension is perpendicular to the moving direction of movement 42 of the interferometer, as shown in FIG. 4. When an array 41 of detectors is used, the reference wave, or alternatively a set of combined, spatially distributed reference waves, must cover the whole detector array. Between the detector array and the surface 12, different types of active optical elements can be used, including lenses, cylindrical lenses, polarising filters or beam splitters, windows, apertures, slits etc. Though the instrument can also be used without any optical elements between the detector array 41 and the surface 12.

The signals from each and all of the detector elements are digitised and fed to processors to calculate the movements of the surface. The typical basic signal S(i,t) from a single detector element (i) in the detector array will be of the form:

$$S(i,t) = S_b(i) + S_m(i) \cdot \cos(\alpha(t) + \beta(i)) \qquad (1)$$

Where $S_b(i)$ is a background level;
$S_m(i)$ is a modulation level;
$\alpha(t)$ is a time dependent phase value which is shifted when the distance between the interferometer and the surface changes. $\alpha(t)$ is the same for all detector elements in the detector array, since all detectors get their light from approximately the same area on the surface.
$\beta(i)$ is a constant phase value (starting phase), which varies randomly from detector element to detector element.
t is time In equation (1), the signal S is the same as the intensity on a detector element. What gives useful information is the modulation level with the cosine function (last part of the expression). The background level should be constant during a measurement. The background level is the speckle object wave and the reference wave together, and therefore it is undesirable for the speckle to change.

In FIG. 5, the curves for 4 different pixel elements i=1, 2 . . . 4 are shown after the surface has been moved with a constant velocity.

Generally, the terms $S_b(i), S_m(i)$ and $\beta(i)$ will change due to speckle movements and speckle decorrelation when the interferometer is moved relatively to the surface, but the illumination geometry described earlier is designed to minimises these changes and decorrelations.

Different algorithms can be used to calculate the object displacement from the detector signals S(i,t). [One way is described in the following.

All signals $S(i,t_1)$, i=1,2, . . . in the detector array are stored in the processor memory at time $t_1$. Afterwards, all the forthcoming signals S(i,t) are subtracted from their respective stored reference values $S(i,t_1)$, and the result is then rectified to obtain a new signal R(i,t):

$$R(i,t) = abs\{S(i,t) - S(i,t_1)\} = S_m(i) abs\{\cos(\alpha(i,t) + \beta(i)) - \cos(\alpha(i,t) + \beta(i))\}$$

Figure 5A:
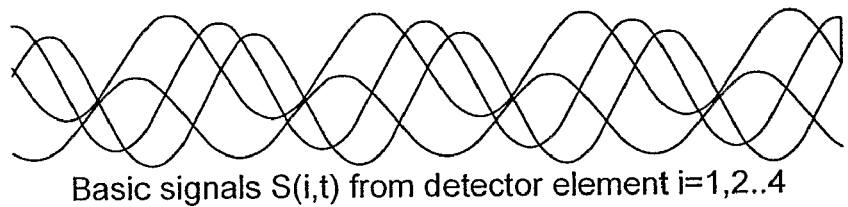
FIG. 5a to 5e show curves for signals detected by the detector elements and calculated signals derived from the detected signals when detector arrays are being used instead of single detectors.
Figure 5B:
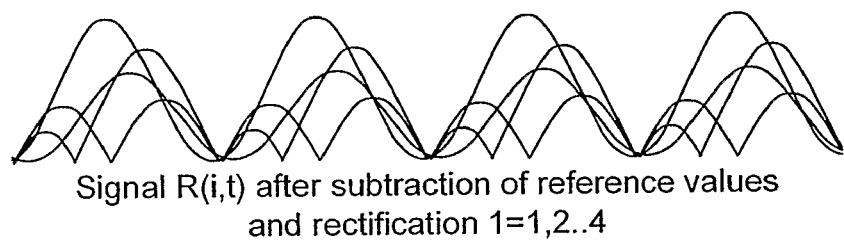
Figure 5C:
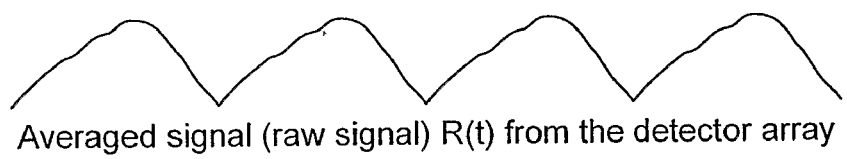

The five different curves for R(it) (i=1,2, . . . 5) are shown in FIG. 5a. Since all detector elements have different and random values of starting phase b (and modulation level $S_m$), they will reach their first zero, third zero, fifth zero and so on at different times as seen in FIG. 5. When the phase α(t), which is due to movements of the surface, has been changed with a value of n·2π (n=1,2, . . . ), then all the curves will be zero at the same time, as also seen in FIG. 5b. If all the R(i,t) curves are summated and averaged, the resulting curve R(t) becomes as shown with the dotted line in FIG. 5c:

$$R(t)=\Sigma R(i,t)\cdot 1/(\text{number-of-elements})$$

When the raw signal R(t) is calculated from a relatively large number of detector signals R(i,t), R(t) becomes close to a rectified sinusoidal function.

The phase values α(t) can now be calculated by use of an phase algorithm, for example:

$$\alpha(t)=\arcsin((R(t)-Min)/(Max-Min)) \quad (2)$$

where Min and Max are the minimum and maximum values of the raw signal R(t) in the neighbourhood of time t. Afterwards, the correct quadrant for the phase α(t) is also found.

Figure 5D:
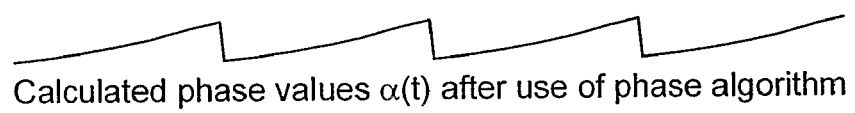
Figure 5E:
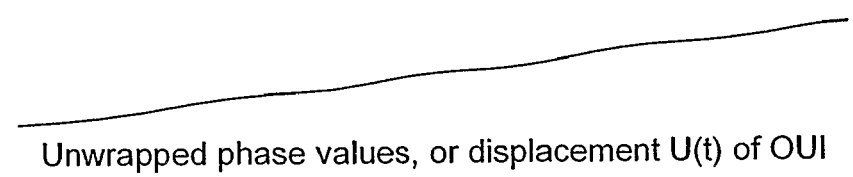

The calculated phase values α(t) are also plotted modulus π in FIG. 5d. A simple phase unwrapping algorithm is used to calculated the phase values over 2π (or under 0), and this is shown in FIG. 5. The object movement U(t) can now be calculated as $$U(t)=G\cdot\gamma\cdot\alpha(t)/2\pi$$

where γ is the wavelength of the laser light
G is a geometry factor which is normally equal to or close to 0.5

Figure 6A:
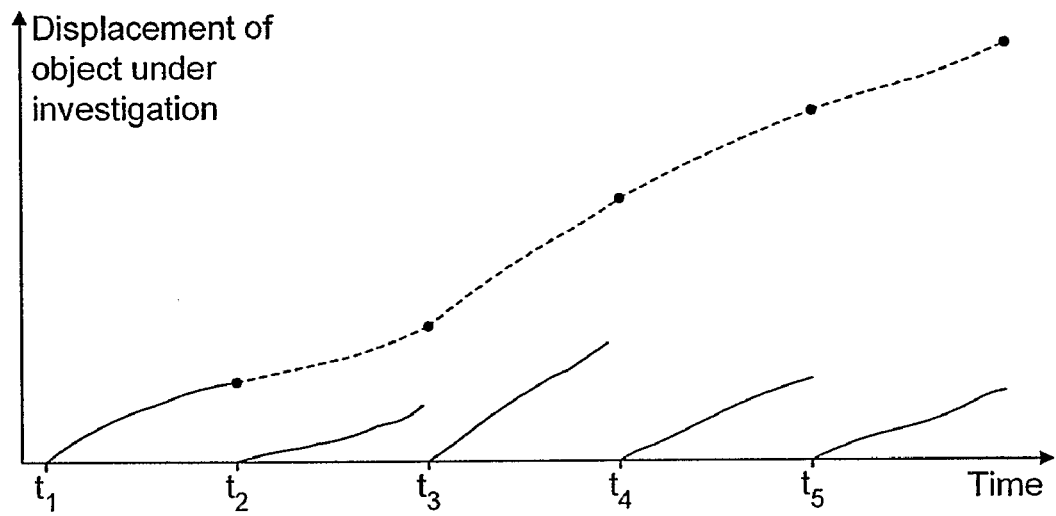
FIG. 6a and 6b are graphs showing sequential measurements.
Figure 6B:
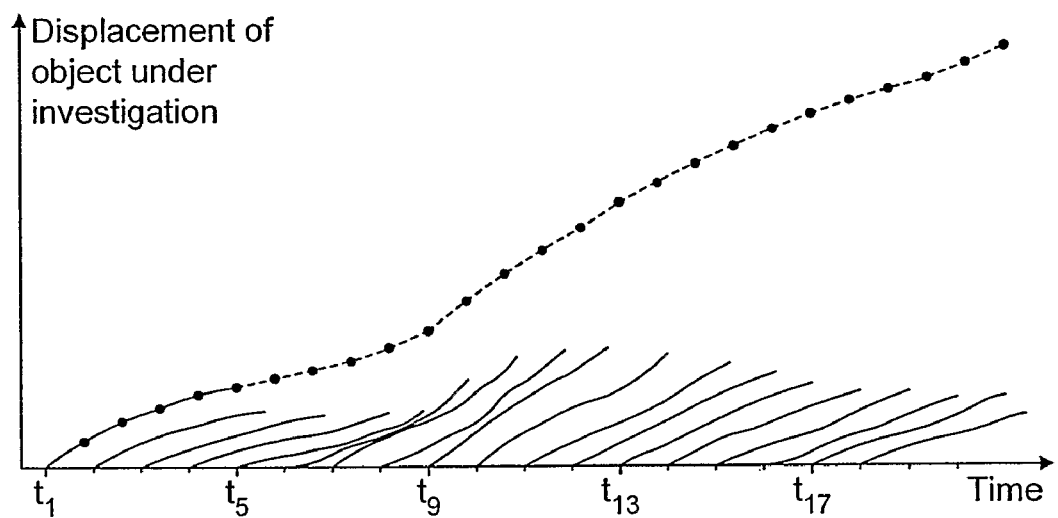

When the reference values $S(i,t_1)$ are stored at time $t_1$, the displacement of the surface can be measured for a period of time after time $t_1$ as described above. After the interferometer has moved a larger or smaller distance compared to the surface (transversal and/or longitudinal displacement, see FIG. 1), the decorrelation of the speckles and hence the decorrelation of the terms S(i,t) becomes too large for reliable measurements. The processors then store new reference values $S(i,t_2)$ at another time $t_2$ and start a new measurement with the new reference values. In this way, sequential measurements in time are obtained, and the processors put these together to form a continues measurement of the displacement of the surface. This is indicated in FIG. 6a. Furthermore, all acquired values of S(i,t) can be used as reference values for a following measurement sequence, and a large number of overlapping sequential measurements can be used as indicated in FIG. 6b.

In the system shown in FIG. 1, a single laser beam and detector system measures the displacements of the surface in the longitudinal direction for the laser beam. This laser beam measurement has no sensitivity to transverse object movements. One way of measuring the fall vectorial 3-dimensional movements of the surface makes use of at least three interferometers with three separate laser beams and three separate detector arrays are required at the same time. The three laser beams can be directed towards different points on the surface, or they can be directed towards the same point on the surface. It is also possible to use one laser beam and three or more detector arrays to obtain 3 dimensional measurements. Other numbers of laser beams and other numbers of detector arrays can also be used. In the following, a unit with one or two or three or more interferometers with different measurement directions is denoted an instrument.

Figure 7:
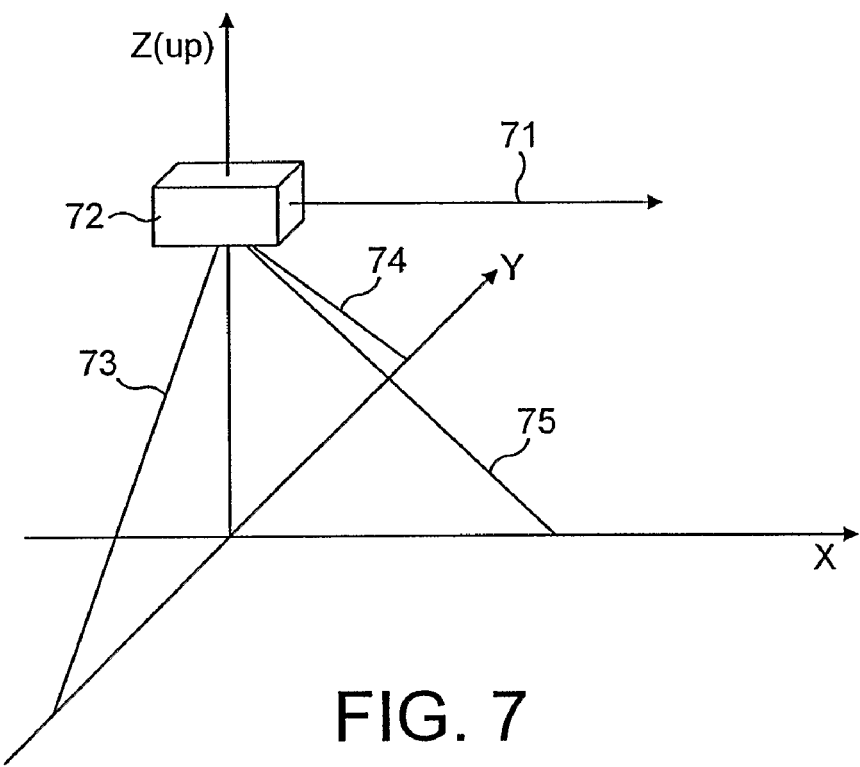
FIG. 7 shows diagrammatically, an instrument with three laser beams.

When two or three or more measurements are carried out at the same time on the surface to acquire 3-dimensional displacement information, one or more measurements with sensitivity components in the x-direction are also required. The x-direction is here defined as the moving direction 71 for the instrument 72 (FIG. 7). The velocity of the instrument 72 in the x-direction may be much higher than the velocities (signals) in the surface which are being measured. The movement of the instrument 72 in the x-direction will be detected by the laser beam 73 with a sensitivity component in the x-direction, so that the small signal from a movement of the surface will be overlaid by a very large and unwanted signal from the instrument movement.

Figure 8:
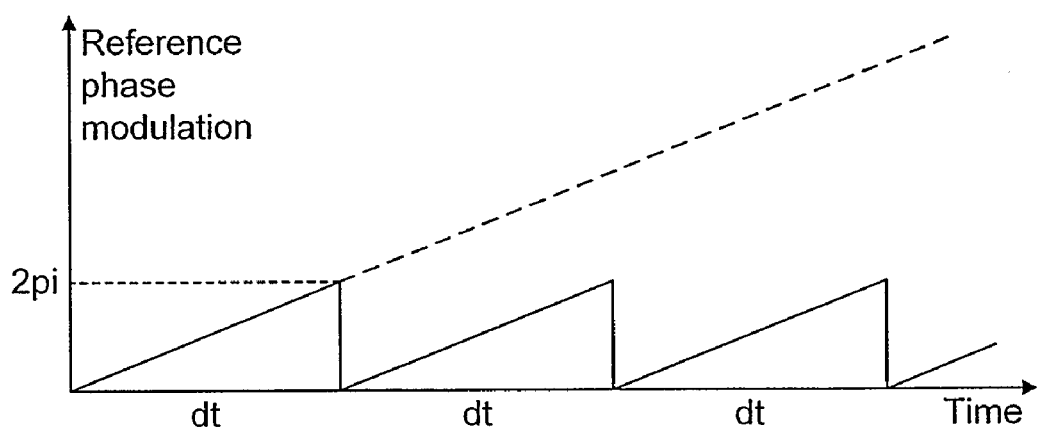
FIG. 8 is a graph showing reference beam phase modulation.

To remove or reduce most of the unwanted signal due to the movement of the instrument 72, phase modulation of the reference beam is used. FIG. 8 shows how this phase modulation is carried out as a function of time. The phase modulation can be carried out using an electro-optic modulator or by using other modulators. It is also possible to use several phase modulators in a row, each being phase modulated according to FIG. 8. The phase velocity of the modulator(s) is given by the time dt in FIG. 8, and the phase velocity should be controlled and varied to fit the velocity of the instrument, so most of the unwanted signals due to the movement of the instrument are eliminated from measurement.

In an ideal system, the instrument with the interferometers would work in the following way:
 i) The instrument is moved forward in the x-direction with perfectly constant velocity;
 ii) The instrument does not move sideways in the y-direction or up or down in the z-direction;
 iii) The instrument does not rotate in any direction (tilt or yaw) during operation.

Under these ideal conditions, the instrument 72 can have three interferometers, with two laser beams 73,74 going out on each side and one laser beam 75 pointing forwards as shown in FIG. 7. The interferometer with the laser beam pointing partly forward in the x-direction can have a reference beam which is phase modulated to remove the effect of the velocity of the interferometer. For this ideal system, the basic type of interferometer described earlier can be used to measure small displacements and vibrations in the object under investigation surface, such as the surface of the sea floor.

In many real measurement environments, the instrument will not move as in the ideal situation described above. The instrument may rotate so that the two laser arms 73,74 which should not pick up any components of the instrument velocity in the x-direction start to do so. Similarly, the laser arm 75 which is pointing forwards may pick up a varying component of the instrument velocity if the instrument is rotating while it is moving in the x-direction. In addition to this, the instrument may also have a translational movement up or down in the z-direction and also sideways in the y-direction. For each of the laser arms, these unwanted velocity components come be on top of the much smaller signals from the displacements or vibrations of the surface.

To address this problem, the instrument and the interferometers are equipped with a function enabling measurements to be taken with multiple sensitivity directions and dynamic sensitivity directions.

Figure 9:
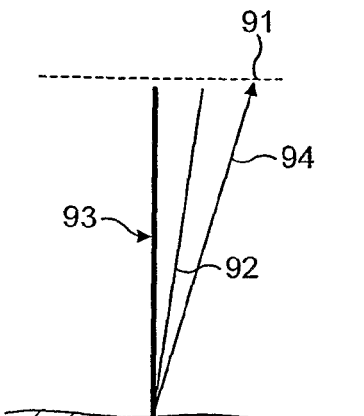
FIG. 9 shows an arrangement of single detectors or a detector array arrangement for accommodating different sensitivity directions.

To obtain the dynamic or multiple sensitivity function, each interferometer in the instrument is designed with many detectors or detector arrays 91 similar to those described earlier, in a long row as indicated in FIG. 9. The sensitivity direction 92 for a single detector or a single detector array 91 is shown in FIG. 9, and this sensitivity direction is along the line with an angular position midway between the illumination line 93 (laser line) and the line 94 from the laser spot on the surface and to the detector or detector array 91. This means that all detectors or detector arrays along the line have their own specified sensitivity direction. The line of detectors or detector arrays will normally be pointing in the x-direction, and it can be up to several decimeters long, or even longer.

When the instrument with the interferometers is rotated to an angular position with respect to the theoretical ideal position described earlier, some detectors or detector arrays will still have a sensitivity direction which is equal to or close to the ideal sensitivity direction in the ideal system. If detector arrays are used, all detector elements in all of the detector arrays along the detector line will have their separate basic signals $S(i,t)$ as described before, and these signals are denoted $SK(i,t)$, where K can be a positive or negative number to identify the position of the detector array on the line. As before, the number i is used to identify the single detector element in detector array K.

The temporal frequency of the basic signals $SK(i,t)$ depends on the velocity of the surface along the sensitivity direction for detector array K. This means that the frequency of the basic signals $SK(i,t)$ along the line of detectors or detector arrays will vary from detector to detector according to the actual sensitivity direction for the different arrays. If the velocity of the interferometer in the x-direction is high, the basic signal frequency will be very high for most of the detectors or detector arrays, and relatively low for one of the detectors or detector arrays only, or for a few detectors. The output signal from the interferometer can be calculated using the basic signals from detectors or detector arrays with relatively low signal frequencies. These detectors or detector arrays are now denoted active detectors or active detector arrays, and they have a sensitivity direction which does not pick up, or picks up very little, of the high instrument velocity in the x-direction.

If the calculation algorithm described earlier is used, the raw signal $R(t)$ which is close to a rectified sinusoidal signal, will be calculated from the active detectors or detector arrays only. But if the detectors or detector arrays have a very high maximum sampling frequency, raw signals from a larger number of detectors or detector arrays, or all detectors, can be calculated. Similar to the basic signals $SK(i,t)$, the temporal frequency of $RK(t)$ also depends on the velocity of the OUI along the sensitivity direction for detector or detector array K.

If the basic signal frequency in a single detector or a detector array becomes too high to be detected because of a limited maximum sampling frequency in the detector array, the amplitude in the basic signals $SK(i,t)$ inside this detector array may decrease towards zero. This is because each detector element will expose over several or a large number of light intensity modulation periods when the frequency is becoming too high, and the detector elements can not follow the fast intensity variations. This effect makes it easy to find the correct detector/detector array or detectors/detector arrays (i.e. the active detector arrays) to be used as input to the phase calculations, since these detectors or detector arrays can be identified simply by analysis of the modulation level along the line of detectors or detector arrays. The detectors with highest modulation levels (highest amplitudes of $SK(i,t)$) will generally be the detectors with lowest frequency.

All the laser arms or interferometers in the instrument can have their respective line of detectors or detector arrays as described above, with all of these lines of detectors or detector arrays pointing in the x-direction or in the xz plane. Generally, the line of detectors or detector arrays will be perpendicular to the respective laser beam direction. If for instance there are two laser beams pointing sideways on each side, the line of detectors or detector arrays for these beams will extend in the x-direction. For a laser beam which is pointing partly forwards, the line of detectors or detector arrays will point forward and upwards, at 90 degrees to the laser beam, but not sideways.

If mirrors or other optical components are used to redirect the light, then the detector or detector arrays can be positioned in other ways and with other directions accordingly. It is not actually necessary that the line of detectors or detector arrays is a perfect line. In the example in FIG. 11 (described below), mirrors are used to redirect the light, the "equivalent" line of detectors or detector arrays would look like the arrangement in FIG. 12. This shows the positions of mirrors from above or equivalent detector (array) positions.

As described above, the interferometers with a line of detectors or detector arrays will eliminate or considerably reduce large velocity components which are due to angular misalignment of the instrument while the instrument is moving in the x-direction. Furthermore, this arrangement will also remove or considerably reduce velocity components due to:

i) a translation of the instrument up or down in the z-direction;

ii) a translation of the instrument sideways in the y-direction iii) different or varying velocity of the instrument in the x-direction compared to the phase modulation (phase velocity) in the reference beam for the beam pointing forwards.

An interferometer having this feature will be referred to as a "line interferometer".

Figure 10:
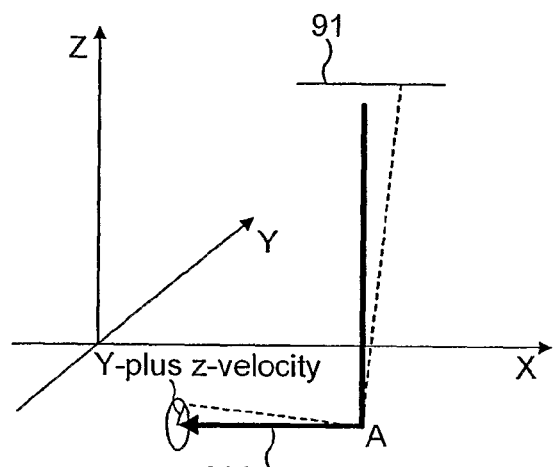
FIG. 10 shows a single detector or detector array arrangement for accommodating angular misalignments and instrument velocity components.

FIG. 10 shows how this works in practice. The total velocity of the instrument becomes the vectorial sum of the x-velocity and the transverse y-and z-velocities (translations). Assuming that the velocity of the instrument in the x-direction is much higher than the transverse velocities (translations), the total velocity is shown as the vector V in FIG. 10. For simplicity, the velocity of the instrument is illustrated as a velocity of the illumination point A on the surface. To eliminate the velocity V including the transverse velocity components from the laser arm measurement, the measurement must be carried out in detector arrays with a sensitivity direction perpendicular to the velocity vector V. As shown in FIG. 10, small transverse velocity components only mean a smaller shift of the active detector array position on the detector line.

The resulting effect is that the line interferometer actually takes advantage of the large instrument velocity in the x-direction to eliminate smaller velocity components in the transverse y- and z-directions. The line interferometer acts like a high pass frequency filter, as constant velocity components (DC levels) are reduced or removed, while varying velocity components (AC levels) are detected and calculated.

In a practical design, a line of detectors or detector arrays can have a limited length only. This means that the dynamic range for the line interferometer is limited with respect to the level of angular misalignment of the interferometer and also with respect to maximum velocities in the transverse y- and z-directions as well as maximum changes and differences in the velocity in the x-direction. To increase the dynamic range for the line interferometer, the laser beam direction can be varied. It is sufficient that the beam direction is varied in one direction only, so the laser spot is moved in the x-direction on the surface (same direction as the line of detector arrays). The modulation signal (amplitudes of $SK(i,t)$) along the line of detector arrays gives information which can be used for controlling the laser beam direction. When the active detector arrays are moving "out of the detector line" on one side, information is provided on how much and in which direction the laser beam should be moved.

If a single recording with the interferometers is made within a limited period of time, the laser direction may not need to be changed during the recording. If the transverse velocities in the y- and z-directions are changed during the recording, or if the instrument is rotating during the recording, the position for the active detector array may move along the line, and the calculation of the output signal will need to be carried out dynamically along the line according to the movement of the active detector or detector array position. But as long as the line interferometer has sufficient dynamic range, the measurement can be carried out continuously throughout the measurement period without moving the laser beam.

Instead of using a line interferometer as described here, the basic interferometer described earlier can also be used with a dynamic laser direction controlling unit only. In this case, without the line interferometer, the laser beam direction still needs to be controlled in one direction only, so the illumination point on the object under investigation is moved in the x-direction. Similar to a line interferometer, this interferometer will still be able to eliminate or reduce the effects from transversal movement of the instrument by taking advantage of the high velocity in the x-direction. However, the laser beam direction has be controlled more often if the transverse velocities are changing or if the instrument is rotating. If the detector array elements have a very high sampling frequency which allows very high frequencies of the raw signal to be detected, then the laser beam direction does not need to be adjusted so often.

Figure 11:
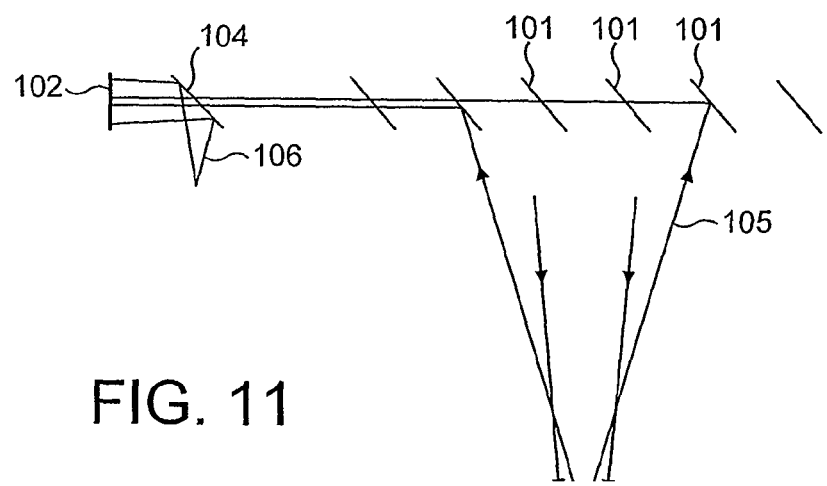
FIG. 11 shows schematically one possible interferometer design.

FIG. 11 shows an example of the design of a line interferometer. Light is reflected by a series of narrow mirrors 101 arranged at about 45 degrees along a line 106 as shown. The different mirrors 101 are located at different depths as seen in the view in the Figure, and they reflect the light towards shorter lines 102 of detector arrays placed side by side on the left hand side of the Figure. In this way, the detector arrays are put together and configured in a rectangular area instead of an elongate array. [I am not sure I have understood this.]

A reference wave 103, or a set of spatially distributed reference waves, are reflected via a partly reflecting glass plate or another type of beam splitter 104, to illuminate the detector arrays with an incoming direction similar to the direction of the incoming object light 105. When the laser beam direction is adjusted by tilting a mirror 101, the mirrors which reflect the object light from the surface are also tilted to ensure the object light is reflected towards the detector arrays with the correct incoming direction.

As described earlier, the laser beam should be focused towards a point or a line below the surface. For this reason, the distance from the line interferometer to the surface must be known. This distance can be calculated by analysis of the frequency difference in the basic signal SK(i,t) between neighbouring detectors or detector arrays along the detector line. Increasing distance from the detector line to the surface means that the difference in sensitivity direction for neighbouring detector arrays becomes smaller, and hence, the frequency difference between neighbouring detector arrays also becomes smaller.

If many instruments and many interferometers are used at the same time, the laser source and also the phase modulator for the reference beams for the interferometers which are pointing forward in the x-direction can be located remotely. Both the reference light and the object light for illumination of the surface can be launched into optical fibres and distributed to the instruments and the interferometers afterwards. Polarisation maintaining fibres can be used, and different laser beams can be sent through the same fibres with crossed polarisation. If the splitting of the laser beam into object- and reference beams is carried out remotely compared to the interferometers, a simple interferometer which takes a small portion from the two beams could be used to detect the time dependent phase drift between the object- and reference beams. This phase drift signal must be corrected for by subtracting it from the output signal for the interferometers.

The interferometer can also be designed as an integrated system with no, or very few moving components. The detector arrays, the processors, the reference beam or beams, the illumination system and other optical and electrical components can be assembled using technical solutions based on integrated optics with internal light guides, integrated electrical circuits etc.

The invention claimed is:

1. An instrument for studying an object, comprising: an interferometer having a source of coherent object light and a source producing a reference beam which is coherent with the object beam, and detector, in which: the coherent light source is expanded and arranged to direct a converging object beam towards a point beyond the object and to produce a reflected object beam reflected from the object; the reflected object beam and reference beam combine to produce a speckle pattern of light representing the effects of the reflection from the object; and the speckle pattern is detected by the detector, wherein:
   the detector comprises a plurality of arrays of detectors;
   the detector arrays are arranged in a line extending in the direction of movement of the instruments;
   the instrument further includes means for generating at least one additional converging laser beam;
   there are at least three detector arrays, each arranged to detect a speckle pattern of light reflected from a respective laser beam; and
   the three detector arrays are arranged to have three different sensitivity directions.

2. A method of conducting an interferometric study of an object, comprising: deploying an instrument comprising an interferometer having a source of coherent object light and a source producing a reference beam which is coherent with the object beam, and detector in the vicinity of the object; expanding the coherent light source; directing a converging object beam of coherent light from the expanded source on to the surface of the object; moving the instrument relative to the object while maintaining a substantially constant distance between them, whereby the beam tracks across the surface of the object; combining the reflected object beam with the reference beam thereby producing a speckle pattern; detecting at intervals the speckle pattern using the detector; comparing sequential intensities in the speckle or speckle patterns detected in order to identify changes in the intensity of the speckle patterns; and creating a set of data representing the changes.

3. A method according to claim 2, wherein the detector comprises an array of detectors.

4. A method according to claim 2, wherein the speckle pattern comprises a single speckle.

5. A method according to claim 2, wherein the converging object beam and reference beam are laser beams.

6. A method according to claim 2, wherein changes of intensity identified in sequential speckles or speckle patterns are associated with movements of the surface of the object.

7. A method according to claim 2, wherein the converging object beam is arranged to converge to a position approximately the same distance beyond the object as the object is spaced from the source.

8. A method according to claim 7, wherein said position is selected from the group consisting of a point and a line.

9. A method according to claim 2, wherein the instrument has a speed of movement, the detector has a sampling rate, and the object is illuminated by the converging object beam over an area having a size, the speed of movement of the instrument, the sampling rate of the detectors and size of the area of the object illuminated by the converging object beam being arranged so that sequential areas of the object studied overlap.

10. A method according to claim 5 further comprising directing at least one additional converging object laser beam on to the surface of the object, combining the respective reflected object beams with a reference beam, and detecting the resulting speckle pattern intensity using respective detectors.

11. A method according to claim 10, wherein the detector arrays have different sensitivity directions.

12. A method according to claim 10, wherein the various laser beams are directed to different areas on the surface of the object.

13. A method according to claims 2, further comprising the step of filtering out of the data, movement of the instrument and any incidental displacements of the instrument.

14. A method according to claim 2, further comprising the step of generating a seismic event, whereby movements in the surface of the object represent responses to the seismic event.

15. A method according to claim 14, wherein the object is the sea bed.

16. A method of conducting a seismic survey comprising:
generating a seismic event;
applying the seismic event to the earth's surface;
deploying in the vicinity of the earth's surface an instrument that generates a plurality of expanded and converging object beams of coherent light from at least one source, a plurality of reference beams which are spatially and temporally coherent with the respective object beams, and a plurality of corresponding detector arrays;
directing converging object beams on to the surface of the earth to produce reflected object beams;
moving the instrument relative to the earth's surface at a constant distance above the earth's surface whereby source beams track across the earth's surface;
combining the reflected object beams with respective reference beams to produce a plurality of respective speckle patterns;
detecting at intervals the speckle patterns using detector arrays;
comparing, for each object beam, sequential speckle patterns detected in order to identify changes in the intensity of the speckle patterns resulting from movements in the earth's surface in response to the seismic event; and
creating a set of data representing the changes.

17. A method according to claim 16, wherein the object beams and reference beams are laser beams.

18. A method according to claim 16, wherein the object beams are directed to different areas on the surface of the object.

19. A method according to claim 16, wherein the detector arrays have different sensitivity directions.

20. A method according to claim 16, wherein the seismic event is applied to sea bed and the instrument is deployed in the vicinity of the sea bed.

21. A method according to claim 16, further comprising the step of filtering out of the data, movement of the instrument and any incidental displacements of the instrument.

22. A method of producing a seismic survey report of a region comprising: carrying out a method as claimed in claim 16, analysing the set of data to derive representations of underlying strata, and assembling the representations as a depiction of the geological nature of the region.

* * * * *

UNITED STATES PATENT AND TRADEMARK OFFICE
CERTIFICATE OF CORRECTION

PATENT NO. : 7,583,387 B2　　　　　　　　　　　　　　　　　　　　　　Page 1 of 1
APPLICATION NO. : 10/588926
DATED : September 1, 2009
INVENTOR(S) : Meldahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this

Fourteenth Day of September, 2010

David J. Kappos
*Director of the United States Patent and Trademark Office*